(No Model.)
W. C. RIESBERRY.
TWINE HOLDER.
No. 426,645. Patented Apr. 29, 1890.
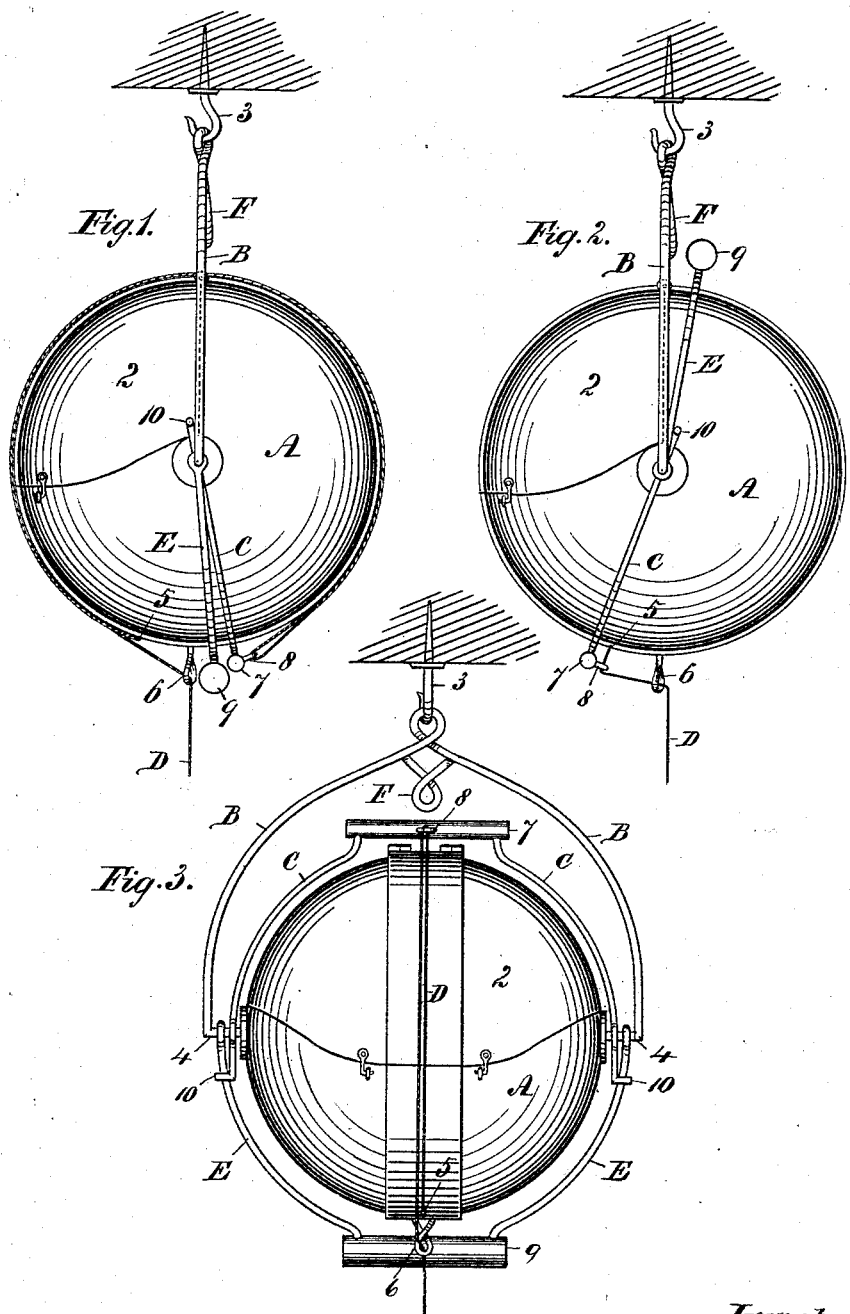

UNITED STATES PATENT OFFICE.

WILLIAM C. RIESBERRY, OF CARBERRY, ASSIGNOR TO JOHN LAMB, OF WINNIPEG, MANITOBA, CANADA.

TWINE-HOLDER.

SPECIFICATION forming part of Letters Patent No. 426,645, dated April 29, 1890.

Application filed December 30, 1889. Serial No. 335,387. (No model.) Patented in Canada May 25, 1889, No. 31,435.

*To all whom it may concern:*

Be it known that I, WILLIAM C. RIESBERRY, of Carberry, in the Province of Manitoba, in the Dominion of Canada, have invented certain new and useful Improvements in Twine-Holders, (for which I have obtained a patent of the Dominion of Canada, No. 31,435, dated May 25, 1889;) and I do hereby declare that the following is a full, clear, and exact description of the same, reference being had to the accompanying drawings, in which—

Figure 1 is a side elevation of my twine-holder suspended and showing the gravitating bails at the position at rest. Fig. 2 is a like view showing the bails in the raised position to gravitate. Fig. 3 is a front view showing the lighter bail pulled up by the twine when drawn downwardly and the heavier bail ready to be pulled up by further drawing the twine down, said bails reacting by gravitation to wind the loose twine back and forth on the outside of the box.

My invention has for its object to draw up the twine after tying has been effected, whereby the end of the twine will be removed from the counter above which the twine-holder is suspended.

My invention consists of a spherical box to contain a ball of twine, said box having a loop and a twine-hole at the bottom exterior, and a bail with arms fixed to opposite poles, and gravitating bails hung to the arms of the fixed bail, the lighter bail having extended ends to engage and lift the heavier bail, said lighter bail having a loop at the middle through which to pass the twine, and said twine returned to the loop pendent at the bottom of the box, so that by drawing down the twine out of the box the bails will be raised from their position after gravitation, and when the twine is released the gravitation of the bails will take up the twine by the bails casting it to and fro on the outside of the box.

A is a spherical box or twine-receptacle, having a door 2 for insertion of the ball of twine, and said box is suspended from a hook 3 by a bail B, having horizontal arms 4, secured at their termination to opposite poles of the box, and said box has a twine-hole 5 through the bottom to pass through the twine, and near said hole a pendent loop 6, through which the twine is threaded prior to its departure from the twine-box, as hereinafter described.

C is a gravitating bail, provided with a weight 7 and suspended from the arms 4, said weight provided with a loop 8. The twine D from the hole 5 is passed over the outside of the box A and threaded through loop 8, and thence returned through loop 6, from whence it is drawn down by hand to the extent that use may require.

The box is hung above the counter sufficiently high whereby the twine will not dangle below loop 6, when the bail is at rest, more than will be convenient to seize for use, and when pulled down the effect is to lift bail C to the position shown in Fig. 3 against the resistance of the twine, so that after tying a parcel the end of the twine will be drawn upwardly from the counter by the gravitation of the bail to a position of rest, as shown in Fig. 1, and the "take-up" of the twine will be about one-half the circumference of the box.

In order to diminish the size of the box and to utilize more of its circumference to increase the take-up of the twine, a second gravitating bail E is independently hung to the arms 4 of the bail B, and said bail E is provided with a weight 9, which overbalances bail C and its weight, and said bail C is provided with outwardly-bent ends 10, to engage bail E when the weight 7 of bail C is at the zenith, so that by continued pulling on the twine weight 9 will be lifted to the zenith until it is obstructed by stop F, pendent from the top of bail B, and the twine will be drawn out through hole 5 and frictionally through loops 6 and 8 and downwardly against the resistance of bail E. When the twine is let go after use in tying, bail E will gravitate and overbalance bail C until bail C has passed the zenith, when it will fall by its own gravity and take up the twine by winding the twine upon the circumference of the box A or doubling it between the twine-hole 5 and loop 6 and the loop 8 of bail C.

I claim as my invention—

The combination, with the twine-box A, provided with a loop 6 and bail B, having arms 4, fixed to opposite poles of the box, of the gravitating bail C, provided with bent ends 10 and a weight 7, having a loop 8, and the gravitating bail E, hung to arms 4 and overbalancing bail C when raised to the zenith by the ends 10 engaging bail E, as and for the purpose set forth.

WILLIAM C. RIESBERRY.

Witnesses:
GREGORY BARRETT,
THOS. G. BENNETT.